United States Patent [19]

Suzuki

[11] 4,090,111
[45] May 16, 1978

[54] MALFUNCTION DETECTING APPARATUS FOR USE IN A CRT DEFLECTION CIRCUIT

[75] Inventor: Masao Suzuki, Tokyo, Japan
[73] Assignee: Sony Corporation, Tokyo, Japan
[21] Appl. No.: 730,476
[22] Filed: Oct. 7, 1976
[30] Foreign Application Priority Data
Oct. 20, 1975 Japan .............................. 50-14222[U]
[51] Int. Cl.$^2$ ............................................. H01J 29/70
[52] U.S. Cl. ..................................... 315/411; 358/243
[58] Field of Search ................. 315/411; 358/190, 220, 358/243

[56] References Cited
U.S. PATENT DOCUMENTS
3,885,201   5/1975   Fernsler ................................ 315/411

Primary Examiner—Maynard R. Wilbur
Assistant Examiner—T. M. Blum
Attorney, Agent, or Firm—Lewis H. Eslinger; Alvin Sinderbrand

[57] ABSTRACT

Apparatus is provided for preventing the generation of an excessively high voltage by the high voltage circuit of a CRT device, such as a television receiver, thereby avoiding the danger of producing injurious X-ray radiation and further minimizing the potential fire hazard attributed to such an excessively high voltage. A flyback transformer is connected to a resonant capacitor and is driven by a switching device synchronized with horizontal scanning pulses so that flyback pulses are produced during the normal retrace intervals in the horizontal deflection. A relatively low voltage power supply is coupled to the switching device to apply an operating voltage thereto. A first detecting circuit is coupled to the flyback transformer for detecting a high frequency component included in the flyback pulses in the event of a malfunction of the resonant capacitor, such as a disconnection of that capacitor, which high frequency component causes an excessively high voltage to be produced by the high voltage circuit. A second detecting circuit is coupled to the flyback transformer for detecting a high flyback pulse level that is produced when the operating voltage applied by the low voltage power supply exceeds a predetermined level. In the event that the first detecting circuit detects the presence of a high frequency component or the second detecting circuit detects a high flyback pulse level, a switch is actuated to control the CRT deflection circuit, thereby reducing the level of the flyback pulses, and thus the level of the high voltage produced by the high voltage circuit.

10 Claims, 8 Drawing Figures

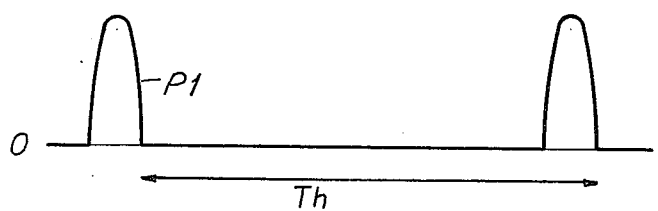
FIG.2A
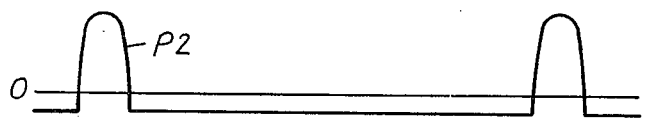
FIG.2B
FIG.2C
FIG.2D
FIG.2E
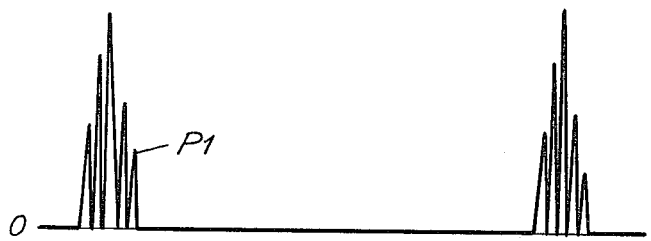
FIG.2F
FIG.2G
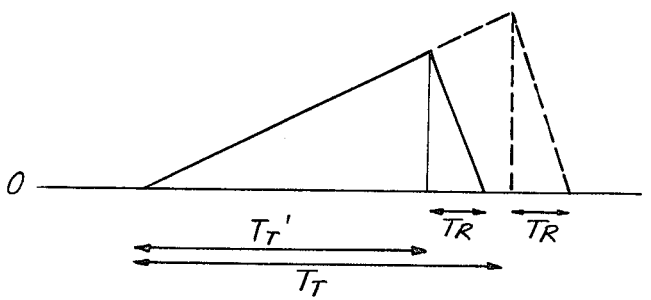

MALFUNCTION DETECTING APPARATUS FOR USE IN A CRT DEFLECTION CIRCUIT

RELATED INVENTIONS

This invention is an improvement over the invention disclosed in copending application Ser. No. 688,899, filed May 21, 1976, and assigned to the assignee of the instant invention.

BACKGROUND OF THE INVENTION

This invention relates to apparatus for detecting a malfunction condition in a cathode ray tube (CRT), such as the video picture tube in a television receiver, and more particularly, to apparatus for preventing the possible generation of an excessively high voltage in the high voltage circuit of such a CRT in the event a malfunction occurs.

In a television receiver, the high voltage that must be supplied to the anode of the CRT, known as the anode voltage, typically is produced in a high voltage circuit that is driven from the horizontal deflection circuit normally used for deflecting the CRT electron beam. The horizontal deflection circuit is supplied with pulses synchronized with the horizontal scanning pulses to supply a sawtooth current through the horizontal deflection coils. A retrace period is provided at the end of each sawtooth current waveform for returning the electron beam to its initial scanning position. As is conventional, the retrace period is much shorter than the trace period, i.e., the period during which the electron beam is deflected to scan across the CRT display screen, so that a relatively narrow retrace, or flyback, pulse is produced.

A typical horizontal deflection circuit capable of producing the trace and retrace signals, respectively, is formed of an electronic switch that is driven by the horizontal scanning pulses, this switch being connected to a resonant LC circuit formed of a horizontal output transformer and a resonant capacitor. While the repetition frequency and period of the trace signal is determined by the horizontal scanning pulses, produced in general by a horizontal oscillator, the period of the retrace signal is determined by the resonant frequency of the aforementioned LC circuit. Thus, when the electronic switch is turned ON, a sawtooth-shaped current flows through the horizontal output transformer, and when the electronic switch is turned OFF, the energy then stored in the transformer tends to oscillate at the resonant frequency determined by the LC circuit. A damper diode normally is included in the horizontal deflection circuit so as to permit the retrace current to oscillate for only one-half of the resonant frequency cycle. At the conclusion of this one-half cycle, that is, at the end of the retrace period, current flows through the damper diode and the horizontal output transformer to initiate the next trace period.

The retrace current through the horizontal output transformer, known also as the flyback transformer, that is, the current flowing during the retrace period, produces a voltage pulse across the flyback transformer. This voltage pulse is transformer-coupled to a secondary winding, resulting in a flyback pulse of very high amplitude. This high-amplitude flyback pulse is rectified by a high voltage rectifying circuit and supplied as the anode voltage for the CRT. Typically, this anode voltage is on the order of 25 kV in, for example, a color cathode ray tube. If this anode voltage becomes excessively high, for example, if it is greater than 30–35 kV, injurious X-ray radiation may be generated from the television receiver. Another potential hazard is that such an excessively high voltage may cause a fire.

As described in aforementioned copending Application Ser. No. 688,899, one source of such an excessive high anode voltage resides in the malfunction of the horizontal deflection circuit. For example, if the normal connection between the resonant capacitor and the horizontal output transformer is open-circuited, that is, if this capacitor is disconnected or otherwise damaged to present such an open circuit, then the LC resonant frequency that is determinative of the retrace period will change. In particular, the effective capacitance now connected to the horizontal output transformer no longer is the capacitance of the resonant capacitor; rather, it now is the stray capacitance of the transformer. Since the value of this stray capacitance is less than that of the resonant capacitor, the LC resonant frequency will increase to a very high value. Consequently, the flyback pulse produced across the flyback transformer will contain correspondingly high frequency components which appear as voltage spikes of extremely high magnitude that are rectified by the high voltage rectifying circuit to produce the excessively high anode voltage. A solution to this problem of an excessive anode voltage caused by the opencircuit, or disconnection, of the resonant capacitor is disclosed in the aforementioned copending application.

However, it now has been found that there is yet another cause of such an excessively high anode voltage. In a typical CRT, the horizontal deflection circuit (as well as other circuits) is supplied with an operating voltage by a relatively low voltage power supply that generally is independent of the high voltage circuit used to generate the anode voltage. This operating voltage, which may be on the order of +130 volts, is produced by rectifying the AC power line voltage and then regulating this rectified voltage to produce the DC operating voltage. If, because of some malfunction in the power supply, this operating voltage is increased, the amplitude of the flyback pulse also will increase, resulting in a correspondingly higher anode voltage. While the high voltage protection circuit disclosed in copending application Ser. No. 688,899 will prevent an excessively high anode voltage from being generated in the event of a malfunction in the horizontal deflection circuit, it does not function to prevent an excessively high voltage from being produced in the event of a power supply malfunction.

It had been thought that a high voltage protection circuit could proceed upon the principle of detecting the flyback pulse amplitude and to suitably control the generation of the flyback pulse in the event that such amplitude exceeds a predetermined level. Although this could function to prevent the generation of an excessively high voltage in the event of a horizontal deflection circuit malfunction or a power supply malfunction, such a flyback pulse level detector necessarily would have to withstand the very high flyback pulse voltage levels. Although semiconductor devices, such as power transistors, are known to have this capability, a power transistor is very expensive and use thereof requires a large amount of space to dissipate the heat generated therein. These qualifications render the use of a power transistor less than advantageous.

OBJECTS OF THE INVENTION

Therefore, it is an object of the present invention to provide improved apparatus for preventing an excessively high voltage from being generated in a CRT in the event of a malfunction in the horizontal deflection circuit or in the event of a malfunction in the relatively low voltage power supply.

Another object of this invention is to provide a high voltage protection circuit for use in a CRT that is capable of detecting different types of error conditions, each of which may be a potential hazard.

A further object of this invention is to provide an improved high voltage protection circuit for preventing an excessively high anode voltage from being generated in a CRT that is inexpensive, has minimal space requirements and that does not require the use of semiconductor devices having high-power capacities.

Various other objects, advantages and features of this invention will become apparent from the ensuing detailed description, and the novel features will be particularly pointed out in the appended claims.

SUMMARY OF THE INVENTION

In accordance with this invention, apparatus is provided for preventing an excessively high voltage from being generated by the high voltage circuit of a television receiver, including a horizontal output circuit comprised of a resonant capacitor and a flyback transformer driven by a switching device in response to horizontal scanning pulses for producing periodic flyback pulses across the transformer; a relatively low voltage power supply coupled to the switching device for applying an operating voltage thereto; a first detecting circuit coupled to the flyback transformer for detecting a high frequency component included in the flyback pulses in the event of a malfunction of the resonant capacitor, such as a disconnection of that capacitor, wherein the high frequency component can cause the high voltage circuit to generate an excessively high voltage; a second detecting circuit coupled to the flyback transformer for detecting an increase in the flyback pulse level caused by an increase beyond a predetermined level of the operating voltage in the event of a malfunction in the low voltage power supply; and a switch actuated by either one or both of the detecting circuits for modifying the operation of the horizontal output circuit thereby to reduce the level of the flyback pulses and, the high voltage generated in response to such flyback pulses.

BRIEF DESCRIPTION OF THE DRAWINGS

The following detailed description, given by way of example, will best be understood in conjunction with the accompanying drawings in which:

FIGS. 2A-2G represent waveforms of various signals produced in the deflection circuit shown in FIG. 1.

DETAILED DESCRIPTION OF A PREFERRED EMBODIMENT

Figure 1:
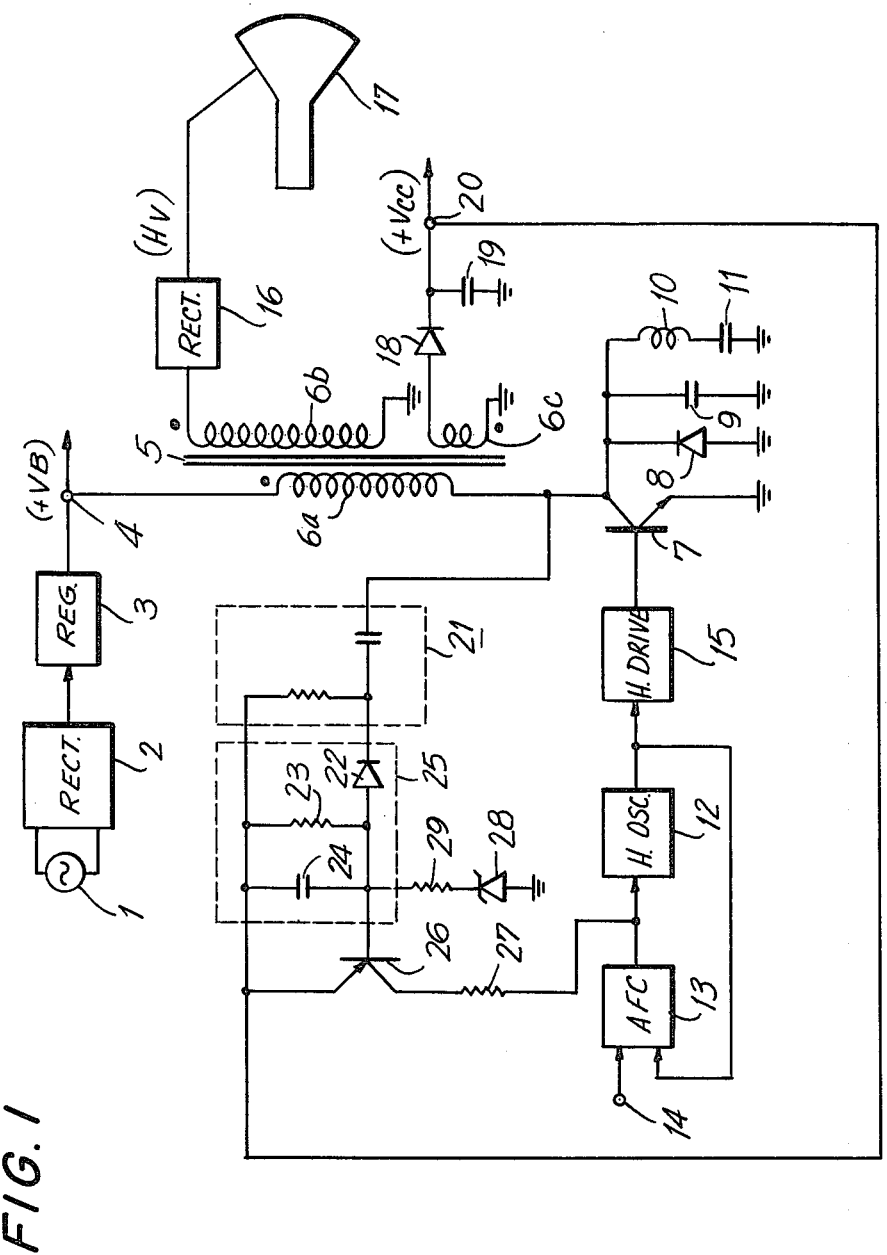
FIG. 1 is a schematic diagram of a cathode ray tube horizontal deflection circuit incorporating high-voltage protection circuitry in accordance with the teachings of the present invention.

Referring now to the drawings, and in particular to FIG. 1, a portion of the horizontal deflection circuit used in a CRT 17, such as a color video picture tube, is schematically shown. The horizontal deflection circuit is provided with an operating voltage $+V_B$ produced in response to the commercial AC power voltage 1 by a relatively low voltage power supply formed of a rectifier 2 coupled to AC supply 1 and a voltage regulator 3 coupled to rectifier 2. The output of regulator 3 is coupled to a power supply output terminal 4 whereat the relatively low operating voltage $+V_B$ is produced on the order of approximately 130 volts DC.

Power supply terminal 4 is coupled through a primary winding 6a of a horizontal output transformer, such as flyback transformer 5, to provide the requisite operating potential for a semiconductor switching device 7 included in the horizontal deflection circuit. In the illustrated embodiment, semiconductor switch 7 is a transistor, such as a switching transistor, driven by horizontal scanning pulses applied to its base electrode. Accordingly, the collector-emitter circuit of switching transistor 7 is connected in series with the primary winding 6a of flyback transformer 5; and this collector-emitter circuit additionally is connected in parallel with a damper diode 8, a capacitor 9 and a series circuit formed of a horizontal deflection coil 10 and shaping capacitor 11. The purpose of capacitor 11 is to provide S-shaping of the horizontal deflection current that flows through deflection coil 10.

The horizontal scanning pulses applied to switching transistor 7 are produced by a voltage-controlled oscillator 12 whose output is connected through a horizontal drive circuit 15 to the base electrode of the switching transistor. The output of oscillator 12 additionally is fed back to an automatic frequency control circuit 13 which is adapted to compare the output of oscillator 12 with a received horizontal synchronizing signal applied to terminal 14 so as to apply a control voltage to the oscillator. As may be appreciated, the synchronizing signal applied through terminal 14 to automatic frequency control circuit 13 is the usual horizontal synchronizing signal that is separated from a received composite television signal by a synchronizing separator circuit (not shown). Thus, the combination of oscillator 12 and automatic frequency control circuit 13 functions as a phase-locked loop for supplying horizontal scanning pulses to switching transistor 7, which scanning pulses are synchronized with the received horizontal synchronizing signals included in the composite television signal. As one example, the oscillating frequency of oscillator 12 is increased if the control voltage level applied thereto by automatic frequency control circuit 13 increases.

As is conventional in a CRT, flyback transformer 5 includes a secondary winding 6b that is coupled to a high voltage rectifying circuit 16 to produce a sufficiently high voltage $H_V$ to be applied to the anode of CRT 17. Typically, the flyback pulse produced across primary winding 6a is transformer-coupled to the secondary winding 6b and then rectified in high voltage rectifier circuit 16 to produce an anode voltage on the order of, for example, 25 kV.

The horizontal deflection circuit thus far described operates in a conventional manner such that at the beginning of a trace period, switching transistor 7 is nonconductive and current flows through the primary winding 6a of flyback transformer 5 and damper diode 8. This current has a sawtooth waveform and increases from a relatively negative level until damper diode 8 approaches cutoff. At that time, a pulse is applied by horizontal oscillator 12 through horizontal drive circuit 15 to transistor 7 so as to turn the switching transistor ON. Hence, trace current continues to flow through primary winding 6a, but now flows through the conducting transistor rather than through damper diode 8. When the pulse produced by oscillator 12 terminates, transistor 7 is rapidly turned OFF. This causes the current through primary winding 6a to decay at a rapid rate. Hence, $di/dt$ through the primary winding is high. The voltage at the collector electrode of transistor 7 can be expressed as $L\, di/dt$, which represents that a pulse of relatively high amplitude is produced across primary winding 6a. The connection of capacitor 9 to primary winding 6a forms a resonant LC circuit having a resonant oscillating frequency determined by the effective inductance of the primary winding and the capacitance of resonant capacitor 9. Since damper diode 8 permits oscillation for only one-half of a cycle whose frequency is equal to the LC resonant frequency, the pulse produced across primary winding 6a has a duration substantially equal to only one-half of this cycle. The retrace pulse produced across primary winding 6a, also known as the flyback pulse, has this one-half cycle duration, as shown in FIG. 2A, and exhibits a pulse magnitude proportional to $L\, di/dt$.

This flyback pulse is coupled to secondary winding 6b and, as is conventional, since the number of turns of the secondary winding is much greater than the number of turns of the primary winding, the flyback pulse coupled across secondary winding 6b is greater than the flyback pulse produced across primary winding 6a. The period of the flyback pulses $P_1$ is equal to the horizontal line interval period $T_h$, as determined by horizontal oscillator 12, and the secondary winding flyback pulses are rectified by rectifier circuit 16 and supplied as the high voltage $H_V$ to the anode of CRT 17. Thus, it is seen that the high voltage $H_V$ is a function of $L\, di/dt$, and thus is porportional to the rate of change of current flow through primary winding 6a.

If there is a malfunction in the horizontal output circuit of the type wherein resonant capacitor 9 is effectively disconnected from primary winding 6a, for example, if a lead wire is severed or if the capacitor malfunctions to present, essentially, an open circuit, then the capacitance included in the resonant LC circuit is modified. More particularly, the capacitance presented by capacitor 9 now is replaced by, essentially, the stray capacitance of primary winding 6a. This stray capacitance is far less than the capacitance of capacitor 9, resulting in a much higher resonant frequency of the LC circuit. Thus, when switching transistor 7 is turned OFF to initiate a retrace period, the energy stored in primary winding 6a tends to oscillate at this higher resonant frequency, as represented by flyback pulse $P_1$ illustrated in FIG. 2E. Since $di/dt$ is much greater than described previously, the flyback pulse level produced across primary winding 6a also is much higher. Consequently, a corresponding higher voltage pulse is induced across secondary winding 6b and, after rectification in rectifier circuit 16 results in an excessively high anode voltage $H_V$. This high voltage presents a potential hazard in that it may cause injurious X-ray radiation and, moreover, may be sufficient to cause a fire in the television receiver.

The reason for flyback pulse $P_1$ to appear as shown in FIG. 2E in the event that resonant capacitor 9 is disconnected from the horizontal deflection circuit is that the higher voltage $L\, di/dt$ produced at the collector electrode of switching transistor 7 drives this transistor into conduction even though no base voltage is applied. As may be observed, this flyback pulse, although provided with a repetition period still equal to the horizontal line interval $T_h$, now includes the higher frequency components attributed to the higher resonant frequency determined by the inductance of primary winding 6a and the stray capacitance associated with this primary winding.

There is yet another source of an excessively high flyback pulse voltage amplitude. This is due to an increase in the operating voltage $+V_B$ applied to power supply terminal 4 by the illustrated low voltage power supply. For example, if a malfunction occurs in voltage regulator 3, such as if a control transistor therein breaks down, the operating voltage $+V_B$ increases. This, in turn, increases the flyback pulse amplitude $P_1$, as shown in FIG. 2C. Consequently, the flyback pulse induced in secondary winding 6b also is increased, thereby increasing the high voltage $H_V$ applied to CRT 17 by high voltage rectifier circuit 16. As mentioned above, this excessively high voltage $H_V$ presents a hazardous condition.

FIG. 1 illustrates high voltage protection circuit that operates to prevent the high voltage $H_V$ from increasing to an unacceptably high level either because of a disconnection of resonant capacitor 9 or because of an increase in the operating voltage level $V_B$. As shown, flyback transformer 5 is provided with an additional secondary winding 6c, this additional winding having a much smaller number of turns than secondary winding 6b. Accordingly, when a flyback pulse $P_1$ is provided across primary winding 6a, a smaller pulse $P_2$, such as shown in FIG. 2B, proportional to flyback pulse $P_1$ is produced across winding 6c. Of course, as is appreciated, pulse $P_2$ has a repetition frequency equal to the flyback pulse repetition frequency as determined by the oscillating frequency of horizontal oscillator 12. Furthermore, because of the AC magnetic coupling characteristics between primary winding 6a and additional secondary winding 6c, the area of pulse signal $P_2$ above the zero-level axis is seen to be equal to the area of that signal below the zero-level axis. A low-voltage rectifier circuit formed of diode 18 and capacitor 19 is provided across winding 6c, thereby to produce a DC voltage level $+V_{cc}$ at a low voltage output terminal 20. Typically, this low voltage $V_{cc}$ which, of course, is porportional to the flyback pulse amplitude, is on the order of, for example, 18 volts. This low voltage $V_{cc}$ is supplied to various other signal processing circuits (not shown) normally included in the television receiver with which CRT 17 may be used. This voltage also is applied to a switching transistor 26 for a purpose soon to be described.

The end of primary winding 6a that is connected to the collector electrode of switching transistor 6 is coupled to a high-pass filter 21. This filter is capable of passing frequencies above the normal resonant frequency of the LC circuit formed of primary winding 6a and capacitor 9, but blocks the normal resonant frequency. Hence, during normal operation, the flyback pulses $P_1$ are not transmitted through filter 21. However, in the event that capacitor 9 is disconnected from primary winding 6a, the high frequency component included in flyback pulse $P_1$, as shown in FIG. 2E, passes through high-pass filter 21. The output from filter 21 is rectified by a rectifier 25 formed, for example, of a diode 22 and a parallel circuit formed of resistors 23 and a capacitor 24. Diode 22 is poled so as to rectify the negative portions of the high frequency component passed by filter 21 so as to produce a relatively negative DC level across capacitor 24. Switching transistor 26 preferably is a PNP transistor whose base electrode receives this DC level, which is less than the voltage $+V_{cc}$ applied to the transistor emitter electrode by terminal 20. The collector electrode of transistor 26 is coupled via a resistor 27 to the control input of horizontal oscillator 12. Thus, when transistor 26 is actuated, or turned ON, the voltage $+V_{cc}$ applied to its emitter electrode is coupled through resistor 27 as a control voltage to the voltage-controlled horizontal oscillator.

In operation, let it be assumed that capacitor 9 is disconnected from primary winding 6a so as to produce the flyback pulse $P_1$ having high frequency components as depicted in FIG. 2E. As described hereinabove, these high frequency components tend to increase the high voltage $H_V$ to unacceptable, excessive levels. These high frequency components appear at the collector electrode of transistor 7, pass through high-pass filter 21, and are rectified to be applied as a DC level to the base electrode of transistor 26. Since diode 18 and capacitor 19 connected across additional secondary winding 6c function as a positive rectifier, it is appreciated that the positive voltage $+V_{cc}$ applied to the emitter electrode of transistor 26 is greater than the voltage applied to the base electrode of this transistor by rectifier 25. Consequently, transistor 26 is actuated, and voltage $V_{cc}$ passes therethrough and through resistor 27 to the voltage control terminal of oscillator 12.

During normal operation, the control voltage applied to oscillator 12 by automatic frequency control circuit 13 is on the order of, approximately, 4 to 5 volts. However, now that the high frequency component included in flyback pulse $P_1$ (FIG. 2E) is detected, transistor 26 is actuated to supply a voltage proportional to $V_{cc}$, on the order of, for example, 7 volts, to oscillator 12. Consequently, the oscillating frequency of oscillator 12 is increased due to this higher control voltage. Accordingly, the frequency of the drive pulses applied to transistor 7 is increased to correspondingly increase the repetition frequency of the trace and retrace signals generated in the horizontal output circuit. That is, the repetition rate of the flyback pulses $P_1$ is increased. This is represented in FIG. 2G wherein the trace period $T_T'$ is decreased because of the increase in the drive pulse frequency, but the retrace period $T_R$ remains the same as before. That is, as shown in broken lines in FIG. 2G, an increase in the frequency of oscillator 12 shortens the trace period from $T_T$ to $T_T'$, but the retrace period $T_R$ remains constant. Therefore, although the voltage across primary winding 6a increases at the same rate as before during the trace period, transistor 7 is turned OFF after a period $T_T'$, which is less than the period $T_T$, thereby preventing the amount of energy stored in primary winding 6a from reaching the same level as before (shown in broken lines). That is, since the peak current value through primary winding 6a at the end of trace period $T_T'$ is less than the peak current value at the end of trace period $T_T$, but since the retrace period $T_R$ is the same as before, then it is seen that the slope of the current through primary winding 6a during the retrace period now is less than the previous slope. Consequently, $di/dt$ is reduced to correspondingly reduce the flyback pulse level $P_1$ as shown in FIG. 2F. Therefore, the high voltage $H_V$, which is proportional to the flyback pulse level $P_1$, is prevented from reaching an unacceptable excessive level.

As an alternative source of an excessive high voltage $H_V$, if the operating voltage $V_B$ increases to produce a higher flyback pulse level $P_1$, as shown in FIG. 2C, it follows that the induced pulse $P_2$ across additional secondary winding 6c is correspondingly increased, as shown in FIG. 2D. The resultant increase in the voltage $V_{cc}$ is sensed in a detector circuit comprised of a reference voltage source, such as Zener diode 28, coupled to the base electrode of transistor 26 via a resistor 29. If the normal DC level of voltage $V_{cc}$ is assumed to be 18 volts, then the reference voltage provided by Zener diode 28, that is, its Zener breakdown voltage, may be selected as 18 volts. Now, when the voltage $V_{cc}$ exceeds the Zener reference voltage by an amount corresponding to the base-emitter voltage $V_{be}$ of transistor 26, this transistor is actuated so as to supply the voltage $V_{cc}$ through resistor 27 to the control terminal of voltage-controlled oscillator 12. This, of course, results in an increase in the frequency of the drive pulses applied to transistor 7, whereby the flyback pulse level is reduced, as described hereinabove, and as depicted in FIG. 2F, to correspondingly reduce the high voltage $H_V$.

Thus, it is appreciated that winding 6c, diode 18 and capacitor 19 operate to produce a voltage level $V_{cc}$ that is proportional to the flyback pulse amplitude. This voltage level is compared to a reference voltage, such as presented by Zener diode 28, and when the reference voltage is exceeded, transistor switch 26 is turned ON. It may be appreciated that, therefore, the reference voltage to which the voltage level $V_{cc}$ is compared is equal to the Zener breakdown voltage of Zener diode 28 plus the base-emitter voltage of transistor switch 26.

In the illustrated embodiment, a single switching transistor 26 preferably is connected in common to the high frequency component detector circuit formed of filter 21 and rectifier 25, and the operating voltage ($V_B$) level detecting circuit formed of winding 6c, diode 18, capacitor 19 and the reference voltage circuit constituted, in this example, by Zener diode 28. Hence, a relatively simple, inexpensive high voltage prevention circuit is shown, and it is appreciated that switching transistor 26 need not be of the expensive power-capacity type. If desired, switching transistor 26 may be replaced by other, equivalent semiconductor switching devices, and Zener diode 28 may be replaced by other conventional reference voltage circuits. As an alternative embodiment, a switching transistor comparable to switching transistor 26 may be actuated in the manner discussed hereinabove to apply, for example, a zero or inhibit voltage level to horizontal oscillator 12 such that, in the event of a malfunction in the television receiver that could cause the high voltage $H_V$ to exceed acceptable limits, the horizontal oscillator is turned OFF. As yet another alternative embodiment, the comparing function performed by transistor 26 may be performed by an additional comparator circuit which is adapted to compare a signal level proportional to the flyback pulse amplitude to a predetermined reference level and to thereby actuate a switching device, such as switching transistor 26, in a manner that results in a reduced flyback pulse amplitude.

While the present invention has been described in conjunction with a preferred embodiment, it should be readily apparent that various additional changes and modifications in form and details can be made by one of ordinary skill in the art without departing from the spirit and scope of the invention. Therefore, it is intended that the appended claims be interpreted as including the foregoing as well as such other changes and modifications.

What is claimed is:

1. Apparatus for preventing the generation of an excessively high voltage by the high voltage circuit of a television receiver, comprising:
   a horizontal output circuit responsive to horizontal scanning pulses and including a switching device, resonant capacitor and flyback transformer connected for producing periodic flyback pulses having a normal frequency component;
   power supply means coupled to said switching device for applying an operating voltage thereto;
   first detecting means comprising high pass filter means coupled to said flyback transformer to allow only high frequency components above said normal frequency to pass through, and rectifying means for detecting a high frequency component included in said flyback pulses in the event of a malfunction of said resonant capacitor, said high frequency component causing said high voltage circuit to generate an excessively high voltage;
   second detecting means coupled to said flyback transformer for detecting an excessive voltage level of said flyback pulses in the event that the operating voltage applied by said power supply means exceeds a predetermined level;
   switching means coupled to said first and second detecting means and actuated in response to said detected high frequency component and to said detected voltage level, respectively; and
   means for controlling said horizontal output circuit when said switching means is actuated thereby to reduce the level of said flyback pulses.

2. The apparatus of claim 1 wherein said second detecting means comprises a secondary winding included in said flyback transformer for producing pulses proportional to said flyback pulses, the amplitudes of said flyback pulses and said produced pulses increasing in the event that said operating voltage applied by said power supply means increases; and threshold detecting means coupled to said secondary winding for actuating said switching means when said produced pulse amplitude exceeds a threshold level.

3. The apparatus of claim 2 wherein said threshold detecting means comprises rectifier means for producing a rectified voltage corresponding to said produced pulse amplitude; reference voltage means; and comparator means for comparing said rectified voltage to said reference voltage, and to actuate said switching means when said rectified voltage exceeds said reference voltage.

4. The apparatus of claim 3 wherein said reference voltage means comprises a Zener diode.

5. The apparatus of claim 4 wherein said switching means is a transistor means, and said comparator means comprises the base-emitter junction of said transistor means, said Zener diode being connected to one of the base and emitter electrodes of said transistor means and supplied with a voltage derived from said rectified voltage, and said rectified voltage being applied to the other of said base and emitter electrodes of said transistor means, such that said transistor means is actuated when the Zener voltage produced by said Zener diode and said rectified voltage combine to forward bias said base-emitter junction.

6. The apparatus of claim 1 wherein said horizontal output circuit includes a voltage-controlled oscillator for driving said switching device, and oscillator control means for synchronizing said oscillator with said horizontal scanning pulses; and wherein said means for controlling said horizontal output circuit comprises means for supplying a predetermined voltage to said voltage-controlled oscillator through said actuated switching means, whereby said switching device is driven at a predetermined rate.

7. In a cathode ray tube having a high voltage circuit including a flyback transformer coupled to a horizontal deflection circuit for generating a normally high voltage in response to the flyback pulses produced by said flyback transformer during periodic retrace intervals, said horizontal deflection circuit including a switching device driven by horizontal scanning pulses and a resonant capacitor coupled to said flyback transformer for determining said flyback pulses, and a relatively low voltage power supply for providing an operating voltage to said switching device, apparatus for preventing said high voltage circuit from generating an excessively high voltage, comprising:
   a high-pass filter coupled to said flyback transformer for passing high frequency components included in said flyback pulses in the event of a malfunction in said horizontal deflection circuit, such as the disconnection of said resonant capacitor;
   first rectifying means coupled to said high-pass filter for producing an actuating signal in response to said passed high frequency components;
   second rectifying means coupled to said flyback transformer for producing a signal level proportional to the amplitude of said flyback pulses, and signal level increasing in the event that said low voltage power supply provides an increased operating voltage;
   comparator means coupled to said second rectifying means for comparing said signal level to a reference level;
   switch means coupled to said first rectifying means and to said comparator means, said switch means being actuated by said actuating signal and also when said signal level exceeds said reference level to supply a control signal; and
   means for varying the frequency of said horizontal scanning pulses in response to said control signal so as to decrease the amplitude of said flyback pulses.

8. The apparatus of claim 7 wherein said switch means comprises transistor means having a base electrode coupled to said first rectifying means to receive said actuating signal; and wherein said comparator means comprises reference voltage means coupled to said base electrode, and means for applying said signal level to the emitter electrode of said transistor means.

9. The apparatus of claim 8 wherein said means for varying the frequency of said horizontal scanning pulses comprises a voltage-controlled oscillator for generating said horizontal scanning pulses, said voltage-controlled oscillator having a control input coupled to the collector electrode of said transistor means.

10. The apparatus of claim 7 wherein said comparator means includes a Zener diode for establishing said reference level.

* * * * *